United States Patent [19]

Horii et al.

[11] Patent Number: 5,118,226
[45] Date of Patent: Jun. 2, 1992

[54] METHOD FOR PASSING A CABLE, A WIRE OR AN OPTICAL FIBER THROUGH A PASSAGE

[75] Inventors: Kiyoshi Horii, Tokyo; Kakuji Osumi, Yamaguchi, both of Japan

[73] Assignee: Toa Kikai Kogyo Co., Ltd., Shimonoseki, Japan

[21] Appl. No.: 579,322

[22] Filed: Sep. 10, 1990

[30] Foreign Application Priority Data

May 18, 1990 [JP] Japan ............................. 2-128288
May 18, 1990 [JP] Japan ............................. 2-128289

[51] Int. Cl.$^5$ .................... B65G 51/02; B65G 53/42
[52] U.S. Cl. ............................. 406/194; 406/92; 406/192; 254/134.4
[58] Field of Search ........... 406/194, 92, 192, 193, 406/191; 226/7, 97; 254/134.3 R, 134.3 FT, 134.4

[56] References Cited

U.S. PATENT DOCUMENTS

| | | | |
|---|---|---|---|
| 2,310,265 | 2/1943 | Sweeny | 406/194 |
| 2,924,868 | 2/1960 | Dyer | 406/194 X |
| 2,982,082 | 5/1961 | Pool | 406/194 X |
| 3,276,821 | 10/1966 | Edwards | 406/194 X |
| 4,684,296 | 8/1987 | Horii et al. | 406/92 X |
| 4,721,126 | 1/1988 | Horii | |
| 4,953,827 | 9/1990 | Araki et al. | 254/134.4 |

FOREIGN PATENT DOCUMENTS

| | | | |
|---|---|---|---|
| 31437 | 2/1985 | Japan | 406/92 |
| 63-64510 | 3/1988 | Japan | |
| 63-64511 | 3/1988 | Japan | |
| 262339 | 10/1988 | Japan | 406/194 |
| 1-064918 | 3/1989 | Japan | 406/92 |
| 98519 | 4/1989 | Japan | 406/194 |
| 347018 | 12/1989 | Japan | 406/92 |

Primary Examiner—Margaret A. Focarino
Assistant Examiner—James M. Kannofsky
Attorney, Agent, or Firm—Wenderoth, Lind & Ponack

[57] ABSTRACT

In a method of passing a wire, cable, optical fiber or the like through a passage, a coanda spiral flow unit is connected to the passage, a pressure release port is provided along the length from the coanda spiral flow unit to the end of the passage, compressed gas is supplied from a portable-type compressed gas supply through a coanda slit of said coanda spiral flow unit, a conductor or a guide is inserted through an end introducing port of said coanda spiral flow unit and passed through the passage. Smooth passing operations can be conducted at high speeds, even through a long and thin passage with many bends.

7 Claims, 6 Drawing Sheets

METHOD FOR PASSING A CABLE, A WIRE OR AN OPTICAL FIBER THROUGH A PASSAGE

FIELD OF THE INVENTION

The present invention relates generally to a method for passing an elongated wire-like article, such as a cable, a wire or optical fiber through a passage. More specifically, it relates to a new method for passing a cable, a wire, or an optical fiber easily and efficiently through even a long and thin passage, as long as approximately 100 m, with many bends.

DESCRIPTION OF THE PRIOR ART

Conventionally, it has been a common practice to pass a conductor through a pipe line or other conduit with a small diameter in buildings, plants and communication facilities. Various methods for passing a conductor through a pipe have been developed.

For instance, methods for passing a cable or a wire which have already been known can generally be divided into those using compressed gas and those which do not use compressed gas. As to the former, the method of forcing a conductor into a passage by supplying compressed gas into it is known. As to the latter, the method of forcing a conductor manually into a passage with a polyethylene pipe or other means is known.

However, in the former method, there is a great limitation as to the bore size of a pipe. The smaller the bore becomes, the more difficult it becomes to pass a cable or a wire through the pipe. Conversely, as the bore becomes larger, the required pressure of compressed gas increases, raising safety problems. In passing a cable or a wire through a long pipe or a pipe with many bends, it is unavoidable that the conductor is brought into contact with an inner wall of the pipe, hence making it extremely difficult to pass it through the pipe.

On the other hand, when a conductor is forced into a passage manually, it is substantially impossible to pass it through a long pipe. Even in the case of passing it through a short pipe, a lot of effort is required.

Recently, there has been increasing use of optical fibers as a light conductor, but in the conventional method for passing it through a passage as described above, it is very difficult to pass an optical fiber into a specified passage smoothly without any damage thereto. Even with the method of using compressed gas, it has been impossible to pass an optical fiber with a connection terminal thereon through a passage. For this reason, after a difficult passing operation, the more difficult operations had to be done with a microscope at the work site. Such operations are a great burden on even the most experienced operators.

It has been proposed, on the other hand, that a coanda spiral flow developed by the inventors of the present invention be used for an operation of passing a cable, a wire or an optical fiber through a pipe.

However, in the conventional method for passing a cable or a wire through a pipe with a coanda spiral flow, fluid control in a device for generating a coanda spiral flow is difficult, and fluid friction and a back general flow is generated in a passage. As a result, a cable or a wire cannot be passed completely through a passage. To improve efficiency of the operation and ensure an easy and convenient passing of a cable, a wire or an optical fiber through a passage with a coanda spiral flow, various improvements had to be made.

The present invention has as an object providing an improved method which enables the passing of an optical fiber or other cables, wires and the like through a passage conveniently and highly efficiently, even a long and thin passage as long as approximately 100 m and with many bends, by developing a conventional method for passing a cable through a pipe with a coanda spiral flow and using it in a practical application.

Other objects, characteristic features and benefits of the present invention will become clear in the following detailed description made with reference to the attached drawings.

DETAILED DESCRIPTION OF THE INVENTION

A method for passing a cable, a wire or an optical fiber through a passage according to the present invention will be described in further detail with reference to the attached drawings.

The present invention is based upon a principle of the conveyance of a cable, a wire or an optical fiber with a coanda spiral flow that has been investigated by the inventors of the present invention and established as a practical process.

A coanda spiral flow is characterized by a vast difference in velocity and density between the axial flow of fluid and the flow around the axial flow, and has a steep velocity distribution curve. For instance, the degree of turbulence is 0.09, less than half of the degree of turbulence of 0.2 for turbulent flow, showing that the coanda spiral flow is in an immensely different condition from a turbulent flow. It is furthermore formed as a unique spiral flow by the synthesis of an axial vector and a radial vector.

This coanda spiral flow is a flow that converges on the pipe axis in a pipe, and has superb features in that it has a small degree of turbulence and that it can prevent hard collisions and contacts with the pipe wall due to the automatic vibration of the conveyed object.

Figure 1:
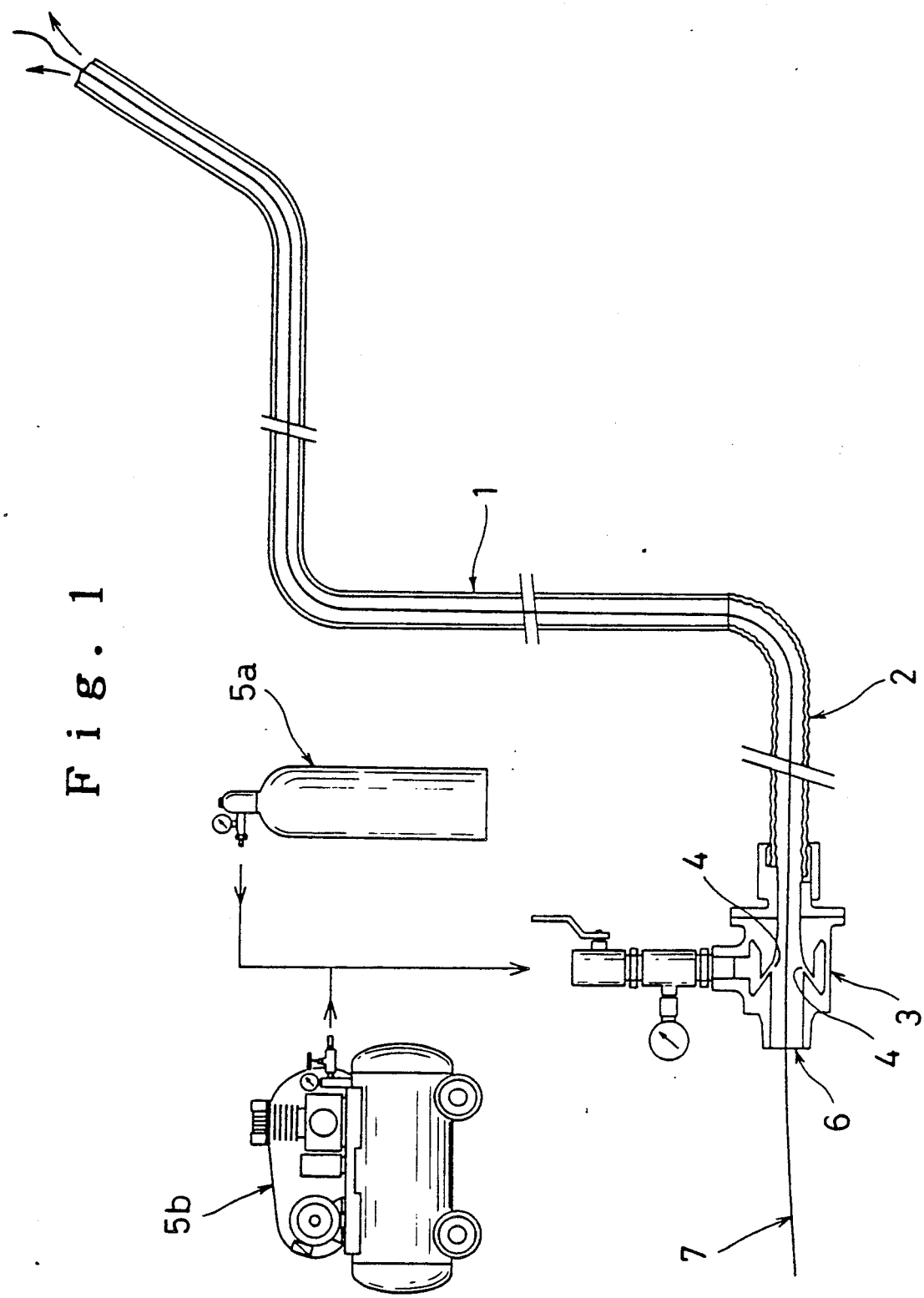
FIG. 1 is a schematic drawing illustrating the method for passing a cable, a wire or an optical fiber through a passage according to the present invention.

As shown in FIG. 1, in a method for passing a cable or a wire through a passage of the present invention, a coanda spiral flow unit (3) is connected to the specified passage (1) through a flexible hose (2) or other such coupling means. Compressed gas is supplied in the direction of passing a cable, a wire or an optical fiber into the passage (1) by means of a portable-type compressed gas supply means (5a) or (5b) via a coanda slit (4). Under this condition, the specified conductor or guide (7) is inserted into an end introducing inlet (6) of the coanda spiral flow unit (3).

In the present invention, it is important to provide a pressure release port at an intermediate point along the distance from the coanda spiral flow unit to the end of the passage (1). By opening this pressure release port prior to passing a conductor or a guide (7) into the passage (1), it is possible to control the occurrence of a back flow of compressed gas, and to pass the conductor or guide through in a stable and smooth manner. There is no special limitation on the location of the pressure release port, but considering the ease of operation at work site, it is preferred to provide it at the connection between the passage (1) and the coupling means from the coanda spiral flow unit (3), for example, a flexible hose (2).

The conductor or the guide (7) is automatically conveyed with a coanda spiral flow in the flexible hose (2) and the passage (1), and passed through at high speeds.

One of the features of the present invention is the adoption of a portable type compressed gas supply means (5a) or (5b). For instance, an appropriate pressure tank (5a) of air or $N_2$ or an air compressor (5b) can be used. For the tank (5a), one which has an internal pressure of, for example, approximately 50 to 180 kg/cm$^2$ and can maintain the pressure of compressed gas supplied to the coanda spiral unit (3) at approximately 2 to 10 kg/cm$^2$ is acceptable.

Figure 2:
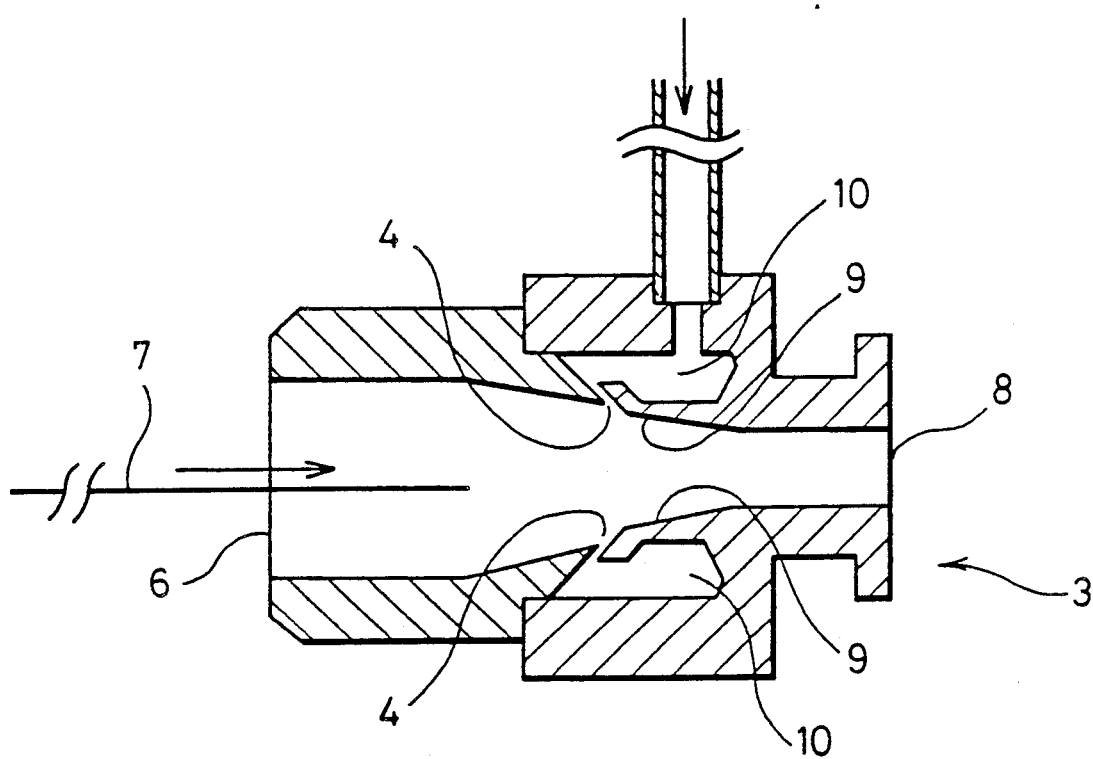
FIGS. 2, 3, 4 and 5 are cross sectional views illustrating a coanda spiral flow unit that can be used in the present invention.
Figure 3:
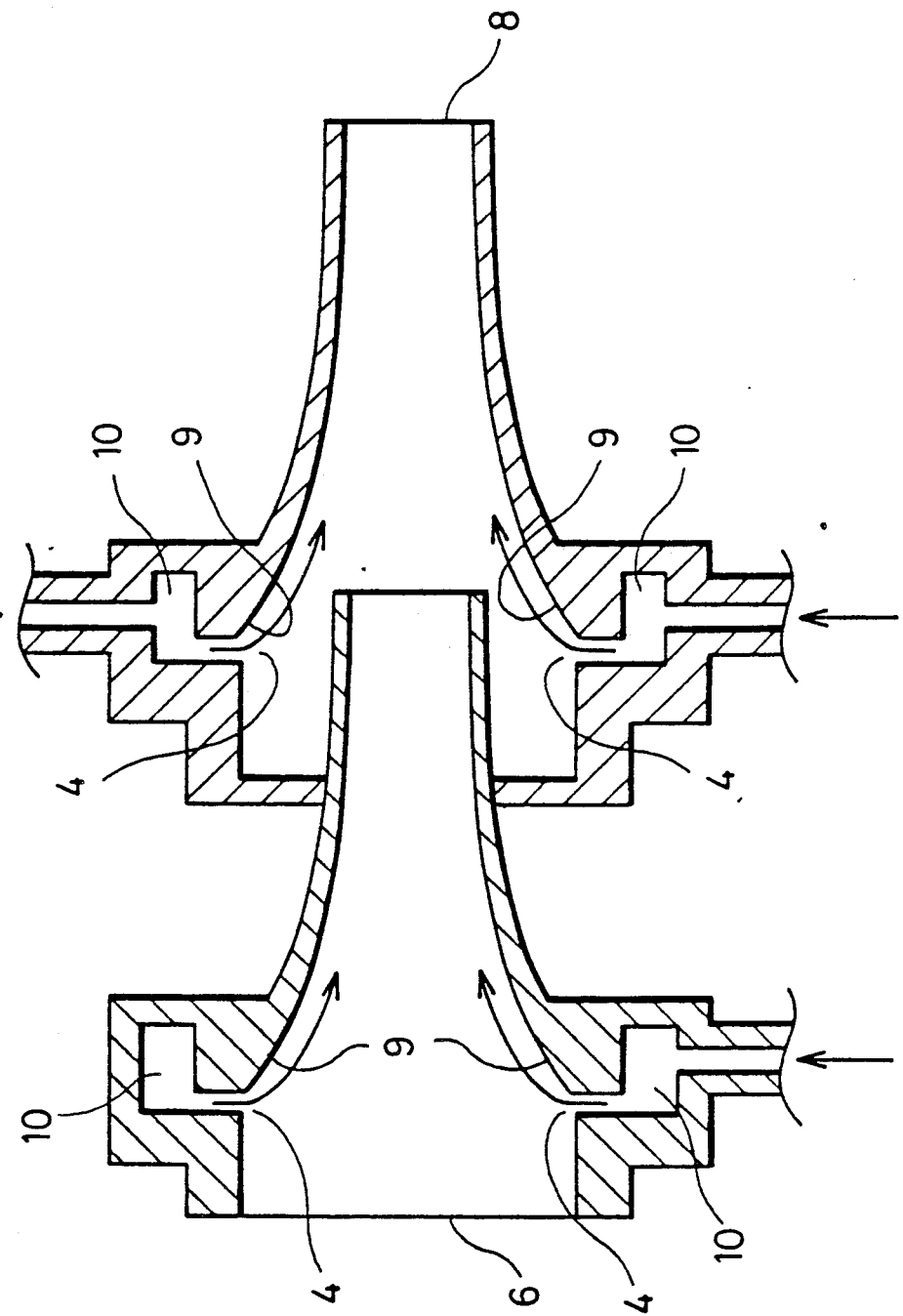
Figure 4:
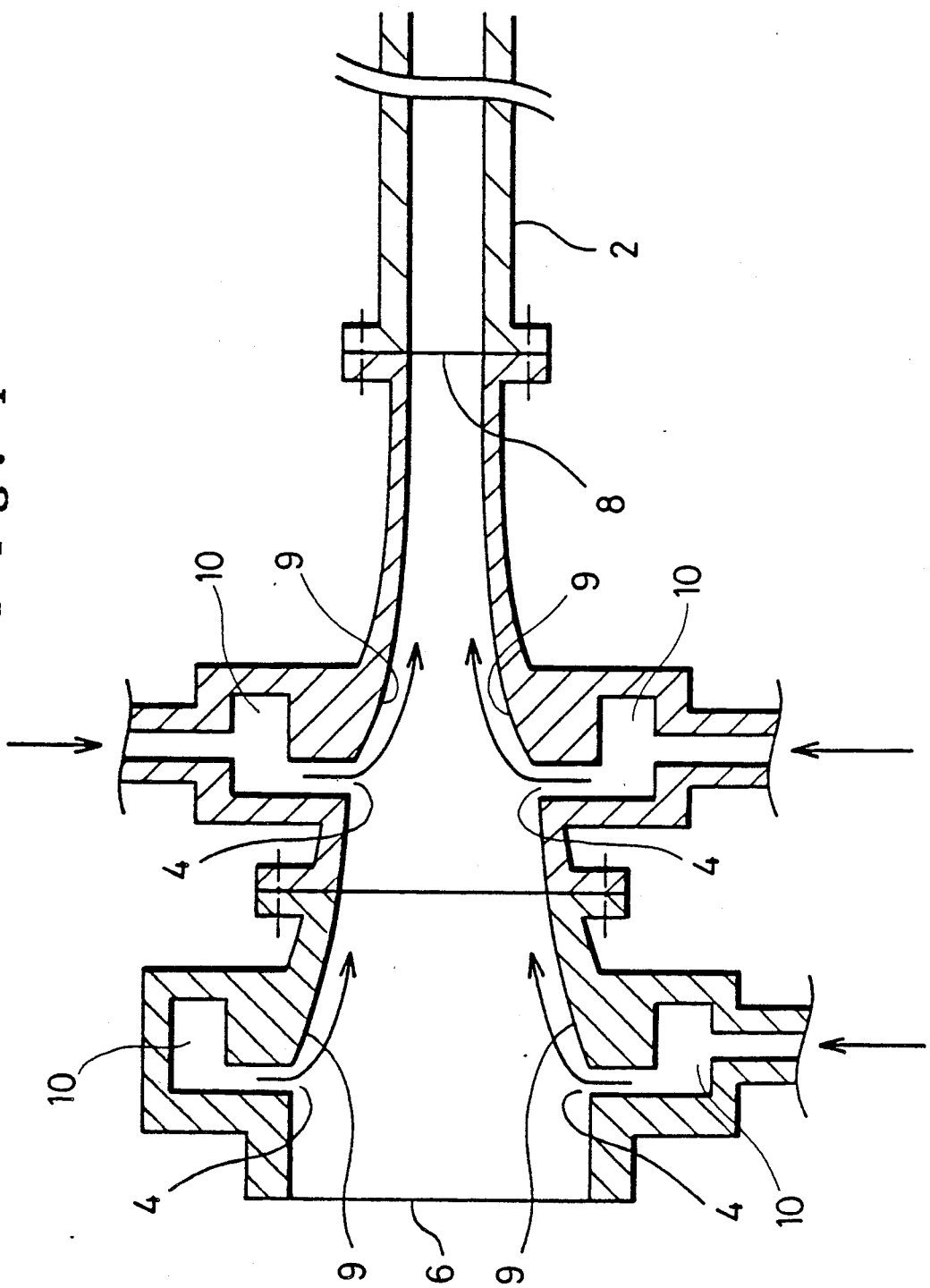

For the coanda spiral flow unit (3), various types have been proposed by the inventors of the present invention, and any of them can be used according to the desired applications. As in FIG. 2, which is an enlarged view of the device as illustrated in FIG. 1, the unit having an annual coanda slit (4), an inclined surface (9) in the vicinity thereof and a ventilation distribution chamber (10) for compressed gas between the discharge outlet (8) to the passage and the end introducing inlet (6) from which a conductor or a guide (7) is inserted are shown as a typical example. In addition, the units having a composite-type unit construction as indicated in FIGS. 3 and 4 can also be used.

Figure 5:
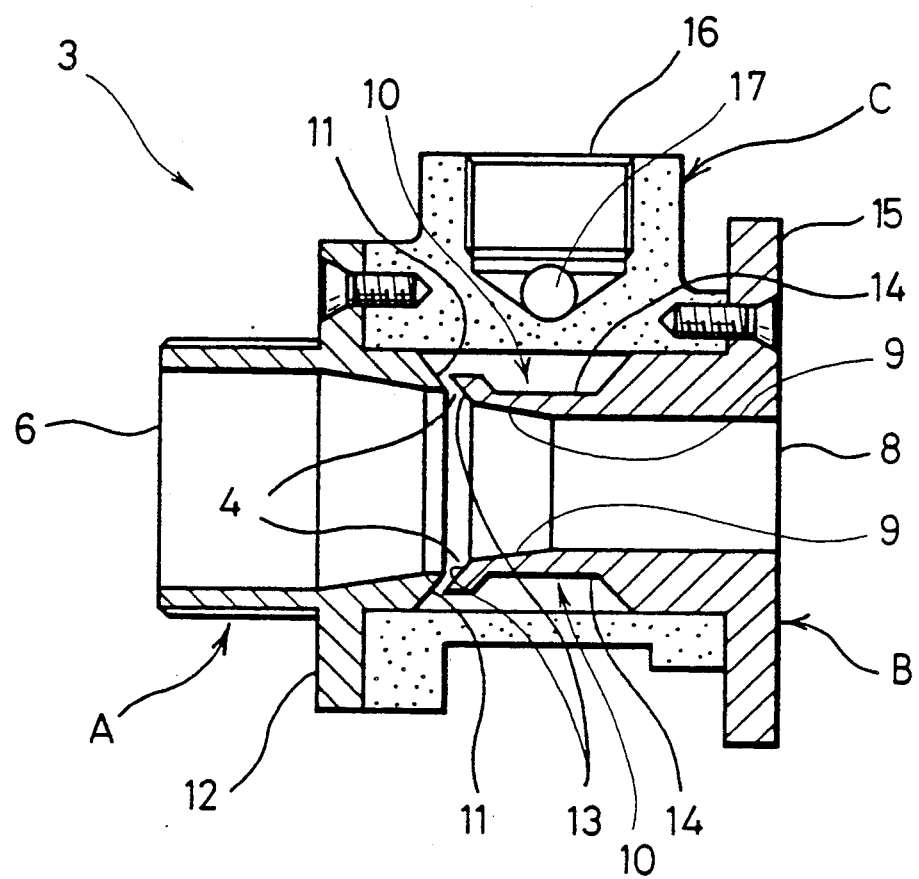

Moreover, as indicated in FIG. 5, a structure divided into three units can be used: a first unit (A) having an end introducing port (6), an inclined surface (11) or an erect surface on the outer circumference at the end opposite to said port and a coupling flange (12), a second unit (B) having a discharge outlet (8), an inclined surface (13) or a curved surface on the inner circumference at the end opposite to said outlet (8), having a bore larger than that of said outlet (8), opposing the inclined surface (11) or the erect surface on the outer circumference of the first unit (A) and forming a coanda slit (4), an inclined surface (9) tapered in conical shape from said inclined surface (13) or said curved surface on the inner circumference end to the discharge outlet (8), an annular groove (14) on the surface of the outer circumference end and a coupling flange (15), and a removable outer peripheral tube unit (C) having a ventilation portion (16), covering the inclined surface (11) or the erect surface on the outer circumference end of said first unit and the annular groove (14) on the surface of the outer circumference end of said second unit (B), having both ends in close contact with the coupling flanges (12) and (15) of said units (A) and (B), and forming a ventilation distribution chamber (10) which communicates with said ventilation portion (16). The coanda spiral flow unit (3) as shown in FIG. 5 is a highly convenient unit that can be assembled at any work site where a cable, a wire or an optical fiber is to be passed through a passage at any time. In this example, a conduit (17) is also provided to supply an even flow of compressed gas to the ventilation distribution chamber (10).

In either case, by setting a taper angle of the inclined surface (9) at approximately 20° to 70°, a coanda spiral flow is formed, generating a strong vacuum suction force at the end introducing port (6).

In a passing operation, either electric wires, optical fibers or other conductors, or plastic ropes or other guides can be passed directly through the passage (1). In either case, a passage up to about 150 m, not limited to a normal indoor passage 25 to 30 m long, can have the wire or the like passed through in a single pass.

Examples will be described as follows.

EXAMPLE 1

Figure 6:
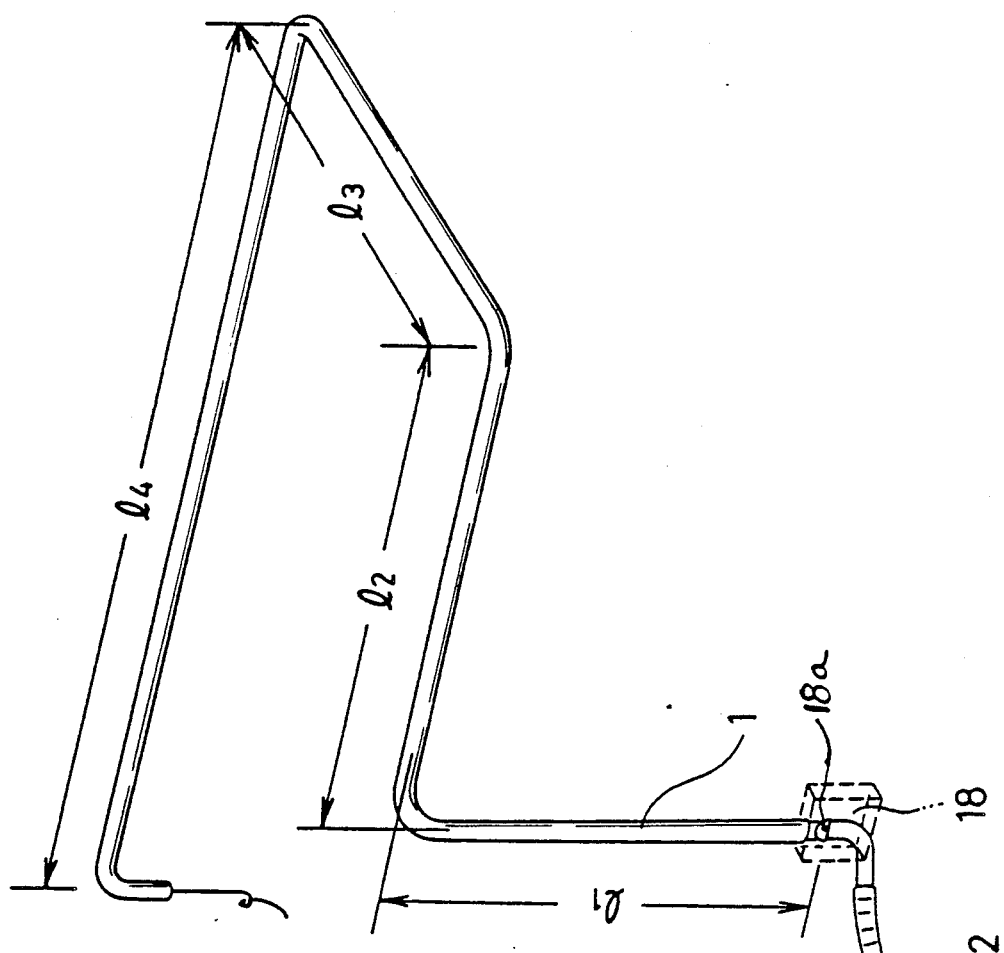
FIG. 6 is a schematic drawing showing an embodiment of the present invention.

As shown in FIG. 6, a polyethylene rope was passed through a passage (1) with a total length of 25 m consisting of lengths $l_1=5$ m, $l_2=5$ m, $l_3=5$ m, and $l_4=10$ m. For the passage (1) in this example, a 22 mm dia. CD pipe was used, and the diameter of the polyethylene rope was 3 mm.

The passage (1) was connected to a flexible hose (2) at joint box (18), and a coanda spiral flow unit (3) as shown in FIG. 5 was connected to said flexible hose (2). The flexible hose (2) was 1.5 m long.

The coanda spiral flow unit (3) was provided with an air filter (19), an opening and closing valve (20) and pressure gauge (21), and compressed air was supplied with a compressor.

Using compressed air with a pressure of 6 kg/cm$^2$, a 25 m long passage (1) could be passed in only a few seconds. The passing operation proceeded smoothly. At that time, a 3 mm-dia. pressure release port (18a) was opened in the vicinity of said joint box (18) of the flexible hose (2), allowing the pressure to release prior to the passing operation. There was no back flows by compressed air during many passing tests.

Also in this example, the inclined angle of the inclined surface of the coanda spiral flow unit (3), and the tapered angle of the inclined surface (13) on the inner circumference end as shown in FIG. 5, was set at 60°, while the coanda slit clearance was 0.18 mm.

EXAMPLE 2

When the passing operation was conducted using a $N_2$ gas took at a pressure of 150 kg/cm$^2$ similarly to Example 1, a very smooth passing operation could be performed at a pressure of 6 kg/cm$^2$.

EXAMPLE 3

A 3 mm-dia. polyethylene rope was passed through a conduit with a diameter of 22 mm and a length of 25 m in a similar manner as in EXAMPLE 2. The passing operation was conducted in only a few seconds.

EXAMPLE 4

A 2.8 mm-dia. optical fiber cable with a connecting terminal was passed through a conduit with a bore of 22 mm and a length of 25 mm in a similar manner as in EXAMPLE 1. A smooth passing was carried out in approximately two minutes without any damage to the optical fiber.

The present invention is not limited to the examples as described above. Various modifications are possible for the type, diameter, bore, length or other details of the conductor, guide, and passage.

What is claimed is:

1. A method for passing an elongated wire-like article through a passage, comprising:
   providing a coanda spiral flow unit having an inlet end and an outlet end and a coanda slit therebetween;
   connecting the outlet end of the coanda spiral flow unit to the passage by a coupling means;
   providing a pressure release port intermediate the coanda spiral flow unit and the end of the passage;

providing a portable type compressed gas supply means;

supplying compressed gas from the compressed gas supply means to the coanda slit of the coanda spiral flow unit; and introducing the elongated wire-like article into the inlet end of the coanda spiral flow unit. whereby the article is fed through the coupling means into and through the passage.

2. A method as claimed in claim 1 in which the article is a cable.

3. A method as claimed in claim 1 in which the article is a wire.

4. A method as claimed in claim 1 in which the article is a rope.

5. A method as claimed in claim 1 in which the step of providing a portable type compressed gas supply means comprises supplying a portable compressed gas tank.

6. A method as claimed in claim 1 in which the article is an optical fiber.

7. A method as claimed in claim 6 in which the optical fiber has a connecting terminal on the end passed through the passage.

* * * * *